US009645051B2

(12) United States Patent
Jin

(10) Patent No.: US 9,645,051 B2
(45) Date of Patent: May 9, 2017

(54) AUTOMATIC EXAMINATION DEVICE OF PARTS FOR VEHICLE AND METHOD

(71) Applicant: Hyundai Motor Company, Seoul (KR)

(72) Inventor: Yo Hee Jin, Chungcheongnam-do (KR)

(73) Assignee: Hyundai Motor Company, Seoul (KR)

( * ) Notice: Subject to any disclaimer, the term of this patent is extended or adjusted under 35 U.S.C. 154(b) by 222 days.

(21) Appl. No.: 14/569,729

(22) Filed: Dec. 14, 2014

(65) Prior Publication Data
US 2016/0076916 A1 Mar. 17, 2016

(30) Foreign Application Priority Data
Sep. 17, 2014 (KR) .................. 10-2014-0123882

(51) Int. Cl.
*G01M 17/007* (2006.01)
*G01D 5/30* (2006.01)

(52) U.S. Cl.
CPC ............ *G01M 17/007* (2013.01); *G01D 5/30* (2013.01)

(58) Field of Classification Search
CPC .............................. G01D 5/30; G01M 17/007
USPC .......... 33/288, 286, 600; 356/614; 180/169; 701/93
See application file for complete search history.

(56) References Cited

U.S. PATENT DOCUMENTS

| 5,297,344 A * | 3/1994 | Fukuda | G01M 17/065 33/203.12 |
| 5,644,854 A * | 7/1997 | Bergeron | B21D 1/14 33/288 |
| 6,020,844 A | 2/2000 | Bai et al. | |
| 6,134,792 A * | 10/2000 | January | G01B 11/2755 33/203.18 |
| 6,363,619 B1 * | 4/2002 | Schirmer | G01B 11/27 33/288 |
| 6,583,868 B2 * | 6/2003 | Hopfenmuller | G01B 11/27 33/288 |
| 6,778,131 B2 * | 8/2004 | Haney | G01S 7/4026 342/165 |

(Continued)

FOREIGN PATENT DOCUMENTS

| JP | H07333105 A | 12/1995 |
| JP | H08-276787 A | 10/1996 |

(Continued)

*Primary Examiner* — R. A. Smith
*Assistant Examiner* — Tania Courson
(74) *Attorney, Agent, or Firm* — Mintz Levin Cohn Ferris Glovsky and Popeo, P.C.; Peter F. Corless

(57) ABSTRACT

An automatic examination device of parts for a vehicle allows examination of smart cruise control (SCC) even though the SCC is mounted on different model vehicles. The automatic examination device includes: a base plate provided to be horizontally movable, a part examining plate automatically examining the part for the vehicle; and an elevating part provided on the base plate and vertically moving the part examining plate. It is possible to improve workability and examination reliability by allowing the parts to be automatically examined according to the position of the smart cruise control mounted in the vehicle by moving the position of the part examining plate according to the vehicle model for the different mounting positions of the smart cruise control for each vehicle model to thereby flexibly deal with several vehicle models.

9 Claims, 8 Drawing Sheets

(56) References Cited

U.S. PATENT DOCUMENTS

| | | | | |
|---|---|---|---|---|
| 6,823,601 B2* | 11/2004 | Murray | ................ | G01B 11/27 33/288 |
| 7,121,011 B2* | 10/2006 | Murray | ................ | G01B 11/272 33/203.18 |
| 7,424,387 B1* | 9/2008 | Gill | ................ | G01B 11/272 33/288 |
| 7,501,980 B2* | 3/2009 | Focke | ................ | G01S 7/40 342/174 |
| 7,853,374 B2* | 12/2010 | Ko | ................ | G01S 13/878 33/286 |
| 8,020,307 B2* | 9/2011 | Schwindt | ................ | B60R 11/04 33/288 |
| 8,244,024 B2* | 8/2012 | Dorrance | ................ | G01B 11/2755 29/273 |
| 8,381,409 B2* | 2/2013 | Knoke | ................ | G01B 11/03 33/228 |
| 8,590,167 B2* | 11/2013 | Odom | ................ | A01B 69/007 33/228 |
| 9,170,101 B2* | 10/2015 | Stieff | ................ | G01B 11/275 |
| 2002/0062686 A1* | 5/2002 | Keaton | ................ | B60P 1/4421 73/116.01 |
| 2016/0116273 A1* | 4/2016 | Voeller | ................ | G01B 11/2755 702/94 |

FOREIGN PATENT DOCUMENTS

| | | |
|---|---|---|
| JP | H11-194165 A | 7/1999 |
| JP | 3558272 B2 | 8/2004 |
| KR | 10-2005-0027715 A | 3/2005 |
| KR | 10-0633327 B1 | 10/2006 |
| WO | 2004-027347 A1 | 4/2004 |

* cited by examiner

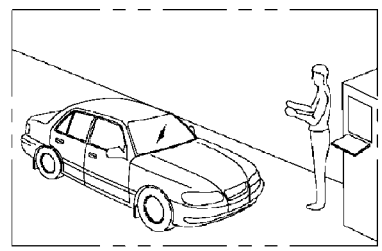
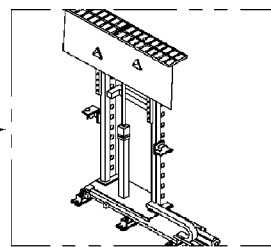
Fig.3A  Fig.3B
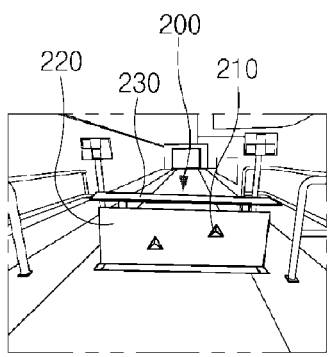
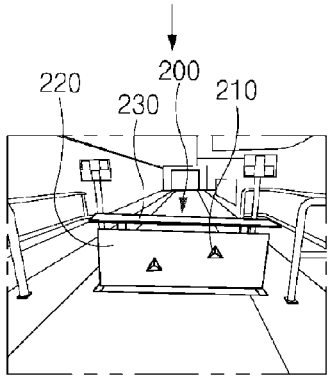
RAISE PART EXAMINING
PLATE (CENTER)
Fig.3F
Fig.3C
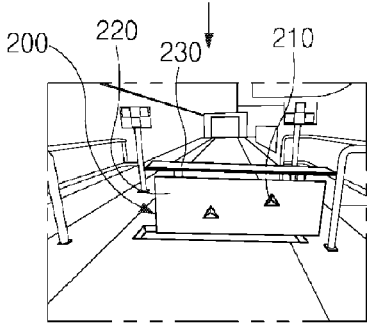
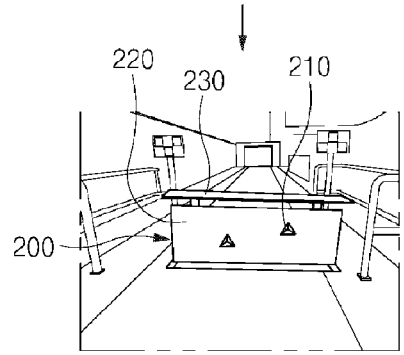
MOVE PART EXAMINING
PLATE TO RIGHT
Fig.3G
RAISE PART EXAMINING
PLATE (CENTER)
Fig.3D
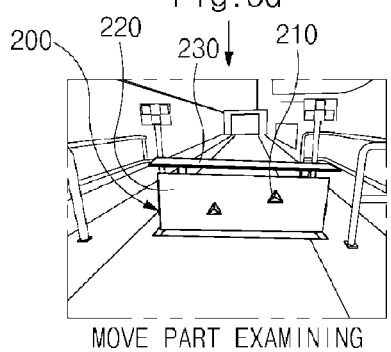
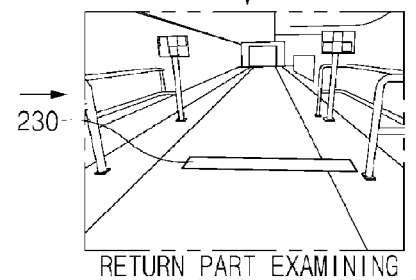
MOVE PART EXAMINING
PLATE TO CENTER
Fig.3H
RETURN PART EXAMINING
PLATE TO ORIGINAL POSITION
(LOWER PORTION)
Fig.3E ent disclosure relates to an automatic examination device of parts for a vehicle, and more particularly, to an automatic examination device of parts for a vehicle so that the parts can be automatically examined by moving a position of a part examining plate according to the different smart cruise control mounting positions for each different vehicle model.

AUTOMATIC EXAMINATION DEVICE OF PARTS FOR VEHICLE AND METHOD

CROSS-REFERENCE TO RELATED APPLICATION

This application is based on and claims the benefit of priority to Korean Patent Application No. 10-2014-0123882, filed on Sep. 17, 2014 in the Korean Intellectual Property Office, the disclosure of which is incorporated herein in its' entirety by reference.

TECHNICAL FIELD

The present disclosure relates to an automatic examination device of parts for a vehicle, and more particularly, to an automatic examination device of parts for a vehicle so that the parts can be automatically examined by moving a position of a part examining plate according to the different smart cruise control mounting positions for each different vehicle model.

BACKGROUND

In general, smart cruise control (SCC) for a vehicle is a unit capable of maintaining a proper distance from a preceding vehicle by automatically controlling a throttle valve, a brake, and a transmission of the vehicle using a position and a distance of the preceding vehicle. The SCC uses radar mounted on a front of the vehicle to gather data to perform proper acceleration or deceleration.

Since the above-mentioned SCC performs the acceleration or deceleration based on the position and distance with respect to the preceding vehicle, it is important to perform a condition confirmation examination for a part position when the smart cruise control is mounted in the vehicle.

However, according to the related art, if the position examination for the SCC mounted in the vehicle is not properly performed, the resulting examination device is not capable of properly recognizing a changed mounting position of the SCC even though the mounting position of the SCC is changed depending on a vehicle model. As a result, marketability and safety may be degraded.

SUMMARY

An aspect of the present disclosure provides an automatic examination device of parts for a vehicle, and more particularly, an automatic examination device of parts for a vehicle for allowing the parts to be automatically examined by moving a position of a part examining plate according to a vehicle model with different smart cruise control mounting positions for each vehicle model.

According to an exemplary embodiment of the present disclosure, an automatic examination device of parts for a vehicle includes a base plate that is horizontally movable, a part examining plate configured to automatically examine the part for the vehicle; and an elevating part configured to be provided on the base plate and vertically move the part examining plate.

The part for the vehicle examined using the part examining plate may be a smart cruise control (SCC).

The automatic examination device may further include a corner reflector for mounting on the part examining plate to examine a mounting angle of the smart cruise control.

A plurality of corner reflectors may be provided.

The part examining plate may include a sensing unit which recognizes the vehicle and checks vehicle information.

The base plate may include: a lower plate having a guide rail formed thereon; and an upper plate horizontally moving along the guide rail.

The automatic examination device may further include a moving member configured to be provided on the base plate and horizontally move the upper plate.

The moving member may include: a cylinder part mounted on the lower plate; and a connecting part connected to the cylinder part and connecting the lower plate and the upper plate to each other.

The lower plate may be provided with an auxiliary rail guiding a movement of the connecting part.

The part examining plate may have a moving plate provided thereon so that the vehicle is movable on the part examining plate when the part examining plate is downwardly moved.

According to another exemplary embodiment of the present disclosure, an automatic examination method of parts for a vehicle includes the steps of: connecting a connector to the vehicle and reading barcode when the vehicle is positioned on a facility line; upwardly moving a part examining plate including a sensing unit using an elevating part; examining a position of a smart cruise control mounted in the vehicle in a state in which the part examining plate is upwardly moved when a horizontal movement of the part examining plate is not required; and examining the position of the smart cruise control mounted in the vehicle in a state in which the part examining plate is upwardly moved and is moved to left or right when the horizontal movement of the part examining plate is required.

The automatic examination method may further include the step of enabling a movement of the vehicle by downwardly moving the part examining plate.

BRIEF DESCRIPTION OF THE DRAWINGS

The above and other objects, features and advantages of the present disclosure will be more apparent from the following detailed description taken in conjunction with the accompanying drawings.

FIGS. 3A, 3B, 3C, 3D, 3E, 3F, 3G and 3H are diagrams showing a part examining process using the automatic examination device according to the exemplary embodiment of the present disclosure.

DETAILED DESCRIPTION

Figure 1:
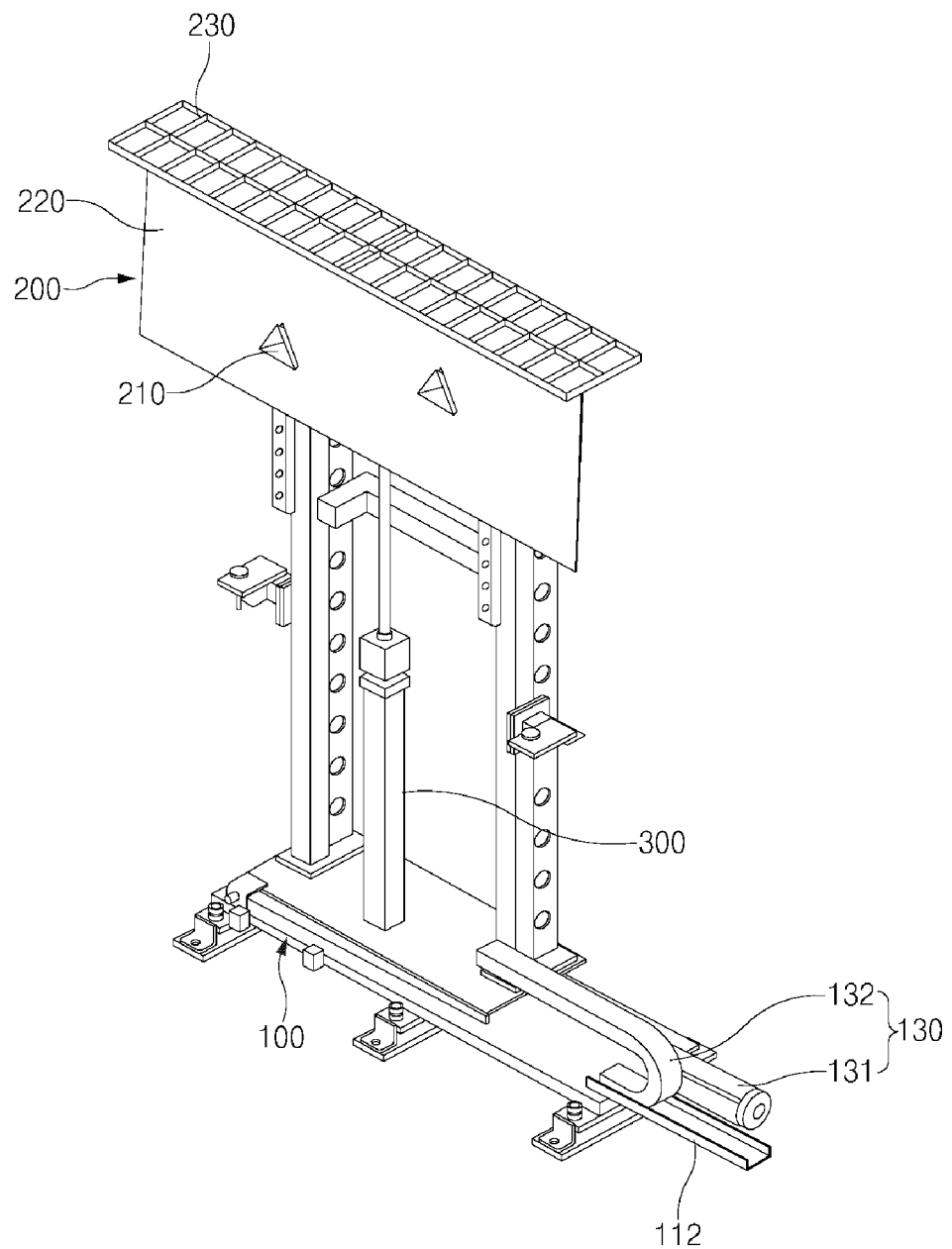
FIG. 1 is a diagram showing a device for automatic examination of parts for a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although an exemplary embodiment is described as using a plurality of units to perform the exemplary process, it is understood that the exemplary processes may also be performed by one or plurality of modules or units that are combined and arranged into fewer or more parts that provide the same functional advantages. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present disclosure will be described in detail with reference to the accompanying drawings.

Figure 2:
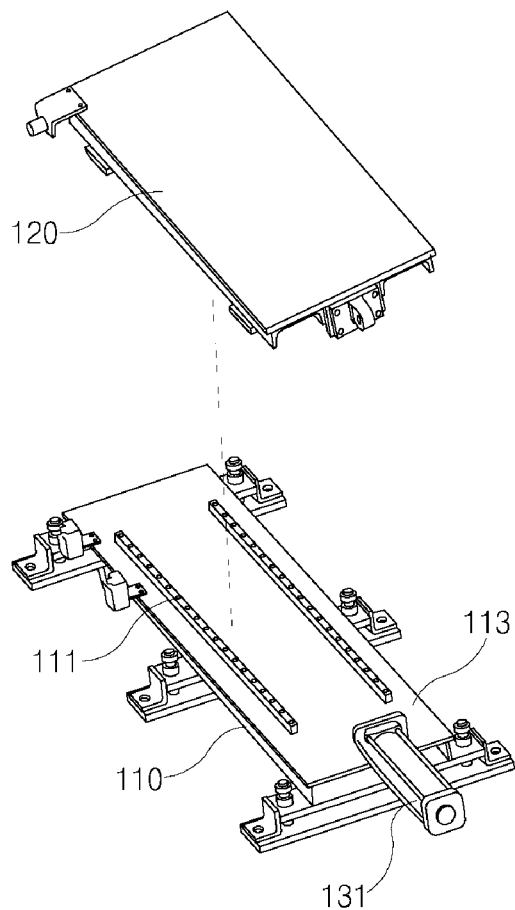
FIG. 2 is a diagram showing a base plate of the automatic examination device according to the exemplary embodiment of the present disclosure.

As shown in FIGS. 1 to 3, an automatic examination device for parts of a vehicle according to an exemplary embodiment of the present disclosure includes a base plate 100 which is horizontally movable, a part examining plate 200 which examines a part P, and an elevating part 300 which vertically moves the part examining plate 200.

As shown in FIGS. 1 and 2, the base plate 100 is installed on a lower portion of a bottom surface of a facility line on which a vehicle is positioned and is provided so as to be horizontally movable, thereby making it possible to adjust a position of the part examining plate 200 to be described below.

In this case, the base plate 100 includes a lower plate 110 having a guide rail 111 formed on an upper surface 113 thereof, and an upper plate 120 positioned over the lower plate 110 and horizontally moving along the guide rail 111.

In addition, the base plate 100 is provided with a moving member 130, which enables the upper plate 120 to be horizontally moved.

Meanwhile, since the moving member 130 includes a cylinder part 131 mounted on the lower plate 110, and a connecting part 132 linked to the cylinder part 131 and connecting the lower plate 110 and the upper plate 120 to each other, the moving member 130 moves the connecting part 132 when the cylinder part 131 is operated, thereby making it possible to move the upper plate 120 with respect to the lower plate 110.

In this case, the lower plate 110 is additionally provided with an auxiliary rail 112, which may guide a movement of the connecting part 132.

The part examining plate 200 is formed in a plate shape as a configuration of automatically examining a part P (see FIG. 4) for the vehicle, thereby making it possible to examine a mounting position of the part P mounted in the vehicle.

The elevating part 300 is mounted on the base plate 100 and vertically moves the part examining plate 200, thereby making it possible to easily examine the mounting position of the part P.

That is, according to the present disclosure, the base plate 100 may be horizontally moved by the moving member 130 and the part examining plate may be vertically moved by the elevating part 300. The distances of movement may be changed depending on a setting.

Figure 6:
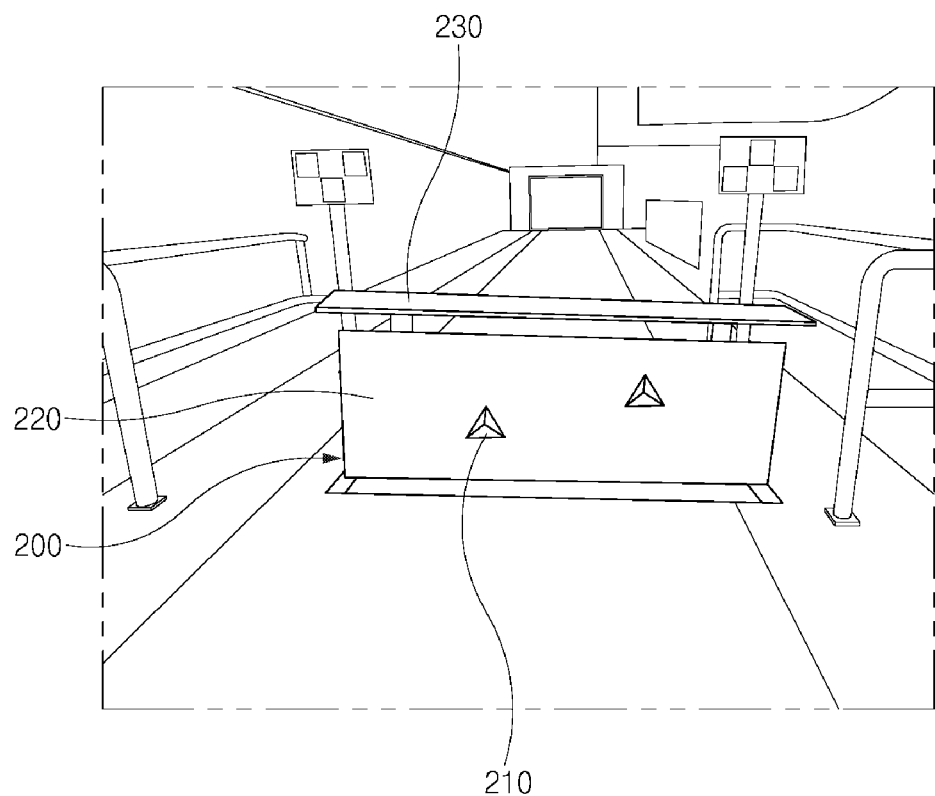
FIG. 6 is a diagram showing a state of a facility line in which a part examining plate is upwardly moved when a part examination is performed in the automatic examination device according to the exemplary embodiment of the present disclosure.
Figure 7:
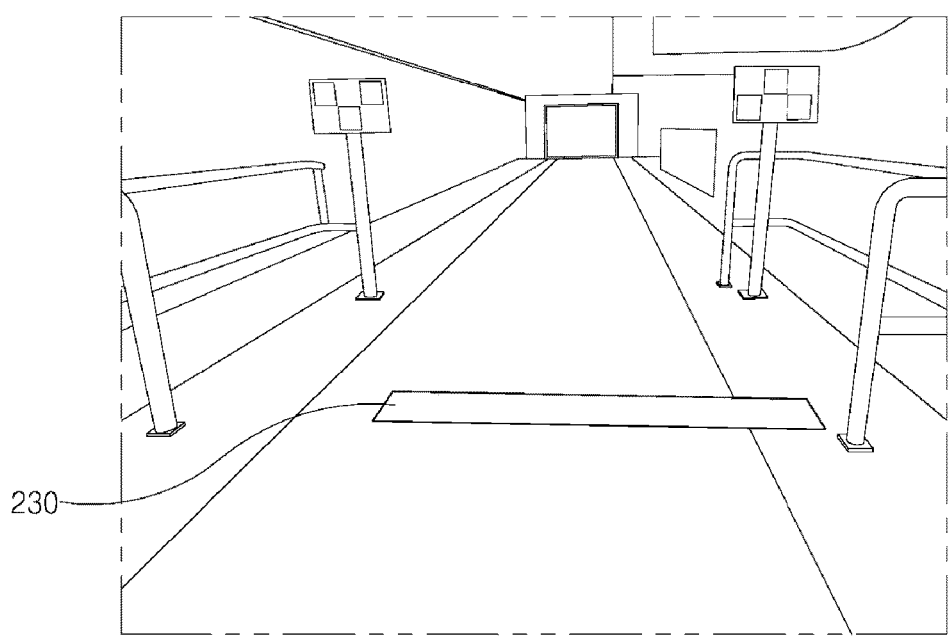
FIG. 7 is a diagram showing a state of a facility line in which a part examining plate is downwardly moved when the part examination is completed in the automatic examination device according to the exemplary embodiment of the present disclosure.

Meanwhile, by providing a moving plate 230 on the part examining plate 200, when the part examining plate 200 is downwardly moved by the elevating part 300 after examining the part P as shown in FIGS. 6 and 7, the moving plate 230 is horizontally positioned on the bottom surface of the facility line to which the vehicle is provided, such that when the vehicle moves on the bottom surface of the facility line, the vehicle moves over the part examining plate 200, thereby making it possible to prevent an occurrence of interference upon the movement of the vehicle.

Here, the part P for the vehicle which is examined using the part examining plate 200 is a smart cruise control (SCC).

Figure 4:
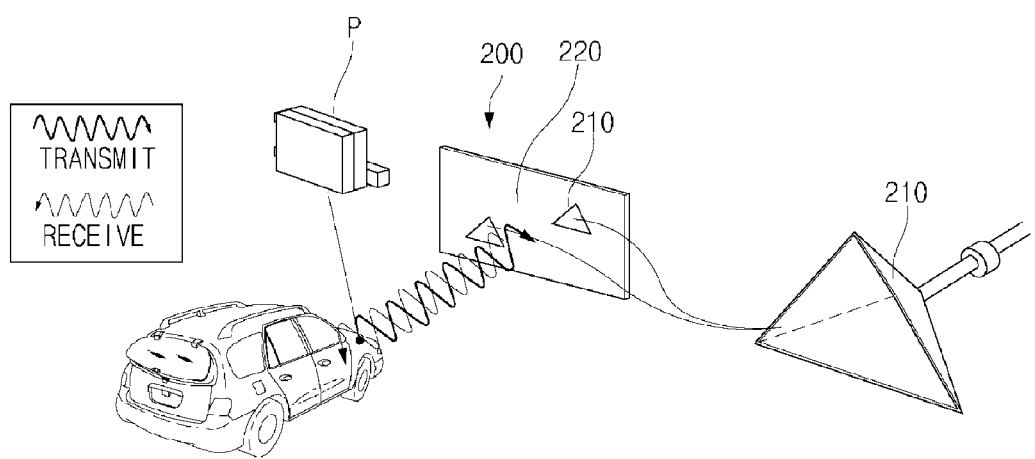
FIGS. 4, 5A and 5B are drawings showing examination principles of the automatic examination device according to the exemplary embodiment of the present disclosure.

As shown in FIG. 4, the part examining plate 200 is provided with a plurality of corner reflectors 210, thereby making it possible to examine a mounting angle of the smart cruise control which is mounted in the vehicle.

Figure 5A:
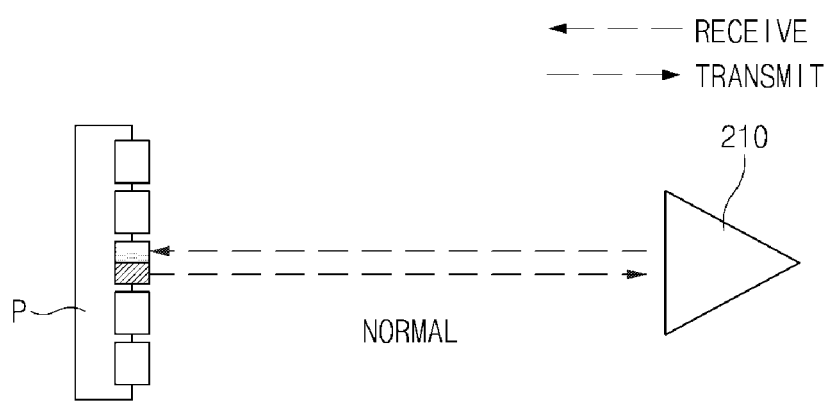
Figure 5B:
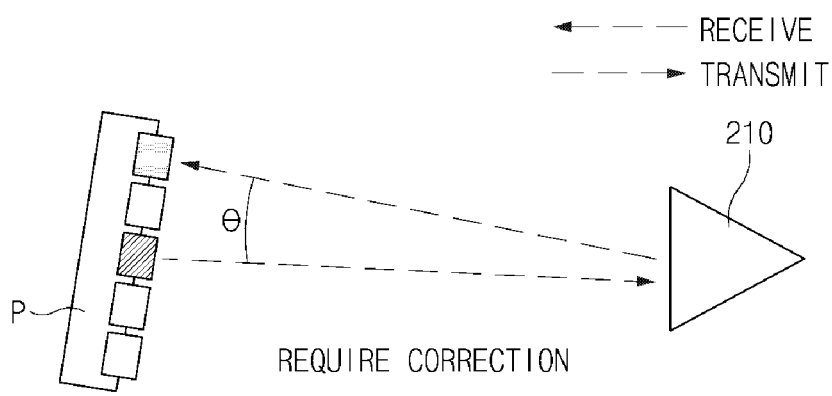

During examination of the mounting angle of the smart cruise control using the corner reflector 210, a laser beam is transmitted from part P to the corner reflector 210. The laser beam is reflected and returned to a reflector provided in the smart cruise control as shown in FIGS. 4 and 5. The part examining plate 200 may examine the mounting angle of the smart cruise control mounted in the vehicle by calculating a difference between transmission and reception values. As shown in FIG. 5A, when the reflected laser beam returns to about the same spot as the origination, the part P is normally aligned. As shown in FIG. 5B, if the reflected laser beam returns to an offset point, so that the outgoing and return beams form an angle θ, then alignment of the part P correction is required.

In addition, the part examining plate 200 includes a sensing unit 220 which recognizes the vehicle and checks vehicle information to determine whether the vehicle is a vehicle model in which the smart cruise control is mounted by checking the vehicle in advance before examining the mounting position of the smart cruise control mounted in the vehicle using the automatic examination device of the parts for the vehicle according to the present disclosure, or to check different mounting positions of the smart cruise control since the mounting position of the smart cruise control is different depending on the vehicle model, thereby making it possible to improve work efficiency by a pre-examination work.

As such, since the automatic examination device of the parts for the vehicle according to the present disclosure includes the base plate 100 which is horizontally movable, the part examining plate 200 which automatically examines the smart cruise control, and the elevating part 300 which vertically moves the part examining plate 200, it may automatically examine the part P by moving the position of the part examining plate 200 depending on the vehicle model for the different mounting positions of the smart cruise control for each vehicle model. To this end, first, as shown in FIG. 3A, the vehicle is positioned on the facility line and a connector is connected to the vehicle, and thereby reads barcode and the like.

Next, as shown in FIGS. 3B and 3C, vehicle information may be received by upwardly moving the part examining plate 200 including the sensing unit 220 using the elevating part 300. The vehicle information may include whether the vehicle is a smart cruise control mounted vehicle model, and what the vehicle model is.

In the case in which the vehicle is a vehicle model for which it is unnecessary to horizontally move the part examining plate 200, the position of the smart cruise control mounted in the vehicle is examined in a state in which the part examining plate 200 is only upwardly moved as shown in FIG. 3D, and after the examination, the part examining plate 200 is downwardly moved as shown in FIG. 3E, thereby making it possible to move the vehicle in which the examination is completed.

Meanwhile, in the case in which the vehicle is a vehicle model in which it is necessary to horizontally move the part examining plate 200, the position of the smart cruise control mounted in the vehicle is examined in a state in which the part examining plate 200 is upwardly moved and is also moved to the right (i.e., horizontally) as shown in FIGS. 3F and 3G, and after the examination, the part examining plate 200 is moved to the center as shown in FIG. 3H, and the part examining plate 200 is then downwardly moved as shown in FIG. 3E, thereby making it possible to move the vehicle when the examination is completed.

Figure 8:
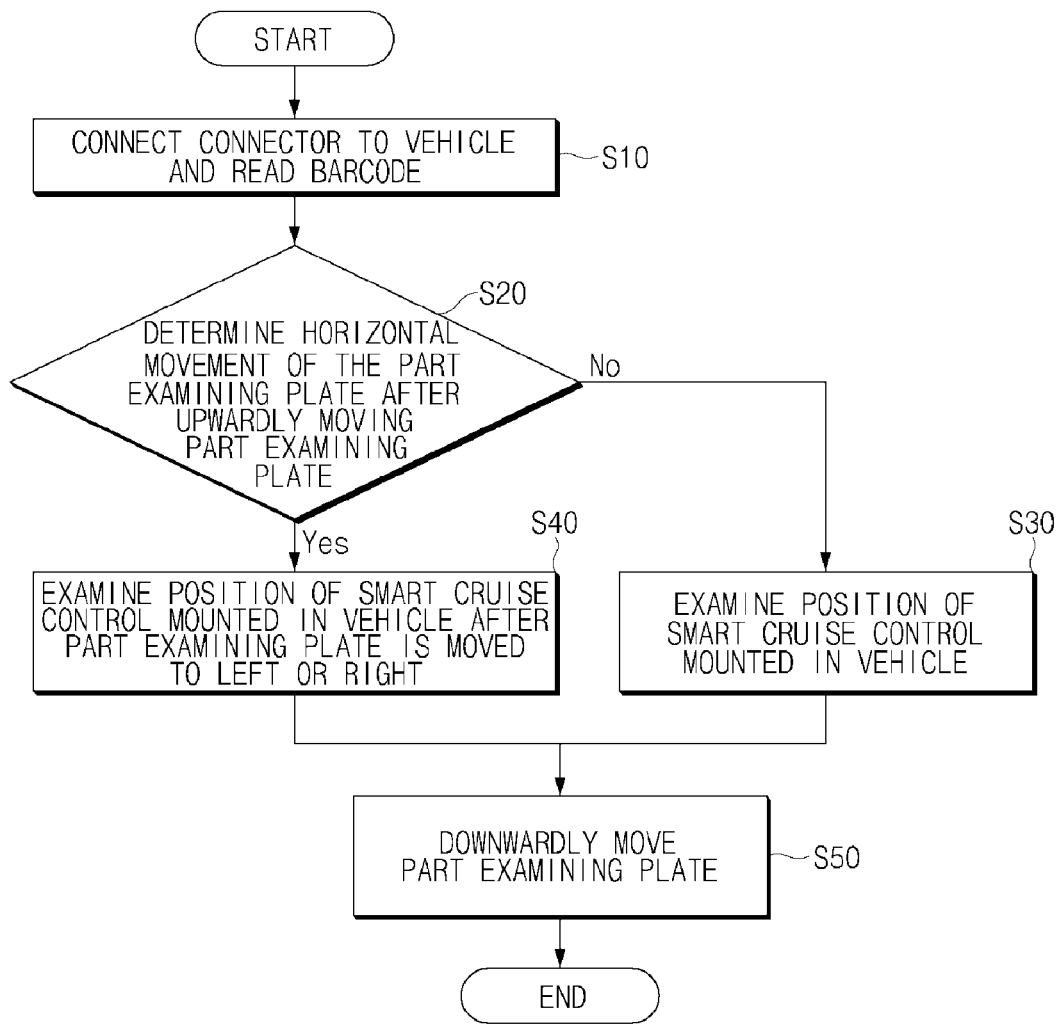
FIG. 8 is a flow chart showing an automatic examination method for parts of a vehicle according to an exemplary embodiment of the present disclosure.

In addition, as shown in FIG. 8, the automatic examination method of the parts for the vehicle according to the present disclosure includes a first operation (S10) of connecting a connector to the vehicle and reading barcode, a second operation (S20) of upwardly moving a part examining plate 200 and then determining whether or not a horizontal movement of the part examining plate 200 is required, a third operation (S30) of examining a position of a smart cruise control mounted in the vehicle when the horizontal movement is not required, a fourth operation (S40) of examining the position of the smart cruise control mounted in the vehicle by horizontally moving the part examining plate 200 when horizontal movement is required, and a fifth operation (S50) of downwardly moving the part examining plate 200.

In the first operation (S10), the vehicle is first positioned on the facility line, and once the vehicle is positioned on the facility line, a connector is connected to the vehicle for reading the barcode.

In the second operation (S20), the part examining plate 200 including a sensing unit 220 is upwardly moved using an elevating part 300, and after the movement of the part examining plate 200, it is determined whether or not the horizontal movement of the part examining plate 200 is further required.

In the third operation (S30), when horizontal movement of the part examining plate 200 is not required, the position of the smart cruise control mounted in the vehicle is examined in a state in which the part examining plate 200 has been upwardly moved.

In the fourth operation (S40), when the horizontal movement of the part examining plate 200 is required, the position of the smart cruise control mounted in the vehicle is examined in a state in which the part examining plate 200 has been upwardly moved, then moved left or right as required.

In addition, the automatic examination method of the parts for the vehicle according to the present disclosure further includes, after the completion of the position examination of the smart cruise control mounted in the vehicle in the third operation (S30) and/or the fourth operation (S40), a fifth operation (S50) of enabling a movement of the vehicle by downwardly moving the part examining plate 200 as shown in FIGS. 3E and 7.

As described above, according to the exemplary embodiment of the present disclosure, it is possible to improve workability and the reliability of examination by allowing the parts to be automatically examined according to the position of the smart cruise control mounted in the vehicle. In response to the particular position, the position of the part examining plate is adjusted according to the vehicle model for the different mounting positions of the smart cruise control to thereby flexibly deal with several vehicle models.

As described above, although the present disclosure has been described with reference to exemplary embodiments and the accompanying drawings, it would be appreciated by those skilled in the art that the present disclosure is not limited thereto but various modifications and alterations might be made without departing from the scope defined in the following claims.

What is claimed is:

1. An automatic examination device of parts for a vehicle, the automatic examination device comprising:
    a base plate mounted for horizontal movement;
    a part examining plate configured to automatically examine a part mounted on the vehicle, wherein the part is a smart cruise control;
    an elevating part mounted on the base plate and coupled to the part examining plate; and
    a plurality of corner reflectors mounted on the part examining plate for examining a mounting angle of the smart cruise control,
    wherein the elevating part moves vertically and, in turn, the part examining plate moves vertically.

2. The automatic examination device according to claim 1, wherein the part examining plate includes a sensing unit which recognizes the vehicle and checks vehicle information.

3. The automatic examination device according to claim 1, wherein the base plate includes:
a lower plate having a guide rail formed thereon; and
an upper plate horizontally moving along the guide rail.

4. The automatic examination device according to claim 3, further comprising a moving member mounted on the base plate for horizontally moving the upper plate.

5. The automatic examination device according to claim 4, wherein the moving member includes:
a cylinder part mounted on the lower plate; and
a connecting part connected to the cylinder part and connecting the lower plate and the upper plate to each other.

6. The automatic examination device according to claim 5, wherein the lower plate is provided with an auxiliary rail guiding a movement of the connecting part.

7. The automatic examination device according to claim 1, wherein the part examining plate has a moving plate provided thereon so that the vehicle is movable on the part examining plate when the part examining plate is downwardly moved.

8. An automatic examination method of parts for a vehicle, the automatic examination method comprising the steps of:

connecting a connector to the vehicle and reading a barcode when the vehicle is positioned on a facility line;

upwardly moving a part examining plate including a sensing unit using an elevating part;

mounting a plurality of corner reflectors on the part examining plate for examining a mounting angle of a smart cruise control;

examining a position of the smart cruise control mounted in the vehicle in a state in which the part examining plate is upwardly moved when a horizontal movement of the part examining plate is not required; and examining the position of the smart cruise control mounted in the vehicle in a state in which the part examining plate is upwardly moved and is moved left or right when the horizontal movement of the part examining plate is required.

9. The automatic examination method according to claim 8, further comprising the step of enabling a movement of the vehicle by downwardly moving the part examining plate.

* * * * *